US011054064B2

(12) United States Patent
Joshi et al.

(10) Patent No.: US 11,054,064 B2
(45) Date of Patent: Jul. 6, 2021

(54) SUPPORT FOR HANGER FOR MOUNTING CABLES

(71) Applicant: CommScope Technologies LLC, Hickory, NC (US)

(72) Inventors: Aviral Joshi, Chicago, IL (US); Ronald A. Vaccaro, Taylorsville, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/837,119

(22) Filed: Apr. 1, 2020

(65) Prior Publication Data
US 2020/0232582 A1 Jul. 23, 2020

Related U.S. Application Data

(63) Continuation of application No. 16/000,559, filed on Jun. 5, 2018, now Pat. No. 10,627,015.

(60) Provisional application No. 62/517,366, filed on Jun. 9, 2017.

(51) Int. Cl.
*F16L 3/127* (2006.01)
*F16L 3/13* (2006.01)
*H02G 3/32* (2006.01)
*F16B 21/06* (2006.01)
*H02G 3/00* (2006.01)

(52) U.S. Cl.
CPC .............. *F16L 3/127* (2013.01); *F16L 3/13* (2013.01); *H02G 3/32* (2013.01); *F16B 21/065* (2013.01); *H02G 3/263* (2013.01)

(58) Field of Classification Search
CPC ... F16L 3/127; F16L 3/13; H02G 3/32; H02G 3/263; F16B 21/065
See application file for complete search history.

(56) References Cited

U.S. PATENT DOCUMENTS

| 4,558,548 A | 12/1985 | Hieger |
| 4,908,245 A | 3/1990 | Shah et al. |
| 5,108,055 A | 4/1992 | Kreinberg et al. |
(Continued)

FOREIGN PATENT DOCUMENTS

| DE | 102004021902 | 12/2004 |
| FR | 2653183 | 4/1991 |
(Continued)

OTHER PUBLICATIONS

"Extended European Search Report corresponding to European Application No. 18813841.6 dated Dec. 18, 2020".
(Continued)

*Primary Examiner* — Eret C McNichols
(74) *Attorney, Agent, or Firm* — Myers Bigel, P.A.

(57) ABSTRACT

An assembly includes: a mounting structure including a mounting hole; a cable hanger having two arms with locking projections, the locking projections inserted into the mounting hole of the mounting structure, and the arms defining a space for engaging a cable; and a support for maintaining the mounting of the cable hanger in the mounting structure, the support including a main panel and first and second fingers extending in a direction away from the main panel. The second finger is inserted between the arms of the cable hanger, and the first finger is positioned laterally of one of the arms.

15 Claims, 7 Drawing Sheets

(56) References Cited

U.S. PATENT DOCUMENTS

| | | |
|---|---|---|
| 6,171,039 B1 | 1/2001 | Seurujarvi |
| 7,097,142 B1 | 8/2006 | Schmidt |
| 8,191,836 B2 | 6/2012 | Korczak |
| 8,342,460 B2 | 1/2013 | Binkert et al. |
| 9,086,175 B2 | 7/2015 | Feige |
| 10,107,419 B2 | 10/2018 | Anderson et al. |
| 10,132,428 B1 | 11/2018 | Ehlen |
| 10,253,906 B2 | 4/2019 | Vaccaro |
| 2001/0019091 A1 | 9/2001 | Nakanishi |
| 2002/0005463 A1 | 1/2002 | Korczak et al. |
| 2005/0121561 A1* | 6/2005 | Sweigard .............. F16L 3/1233 248/74.2 |
| 2005/0249651 A1 | 11/2005 | Riley |
| 2006/0185888 A1* | 8/2006 | Yamada .................. H02G 3/32 174/135 |
| 2009/0230256 A1 | 9/2009 | Widlacki et al. |
| 2009/0294602 A1 | 12/2009 | Korczak |
| 2010/0090479 A1 | 4/2010 | Li et al. |
| 2011/0283515 A1 | 11/2011 | Korczak |
| 2012/0093611 A1 | 4/2012 | Knight, Jr. |
| 2012/0132761 A1 | 5/2012 | Elsmore et al. |
| 2013/0104494 A1 | 5/2013 | Evangelista et al. |
| 2013/0256471 A1 | 10/2013 | Ruiz et al. |
| 2013/0284412 A1 | 10/2013 | Forstenius et al. |
| 2014/0131529 A1 | 5/2014 | Feige |
| 2016/0281881 A1 | 9/2016 | Vaccaro et al. |
| 2017/0219128 A1 | 8/2017 | Anderson et al. |
| 2018/0231036 A1 | 8/2018 | Baumeister et al. |
| 2018/0347725 A1 | 12/2018 | Jung et al. |
| 2019/0234450 A1* | 8/2019 | Zeilenga ............... F16B 43/005 |

FOREIGN PATENT DOCUMENTS

| | | |
|---|---|---|
| GB | 696084 | 8/1953 |
| JP | 2012222986 A | 11/2012 |
| WO | 2015/149128 | 10/2015 |

OTHER PUBLICATIONS

"Office Action corresponding to Chinese Application No. 201880034701.3 dated Jul. 28, 2020".

Notification of Transmittal of the International Search Report and the Written Opinion of the Internationai Searching Authority, or the Declaration corresponding to International Application No. PCT/US2018/036020 dated Sep. 18, 2018.

\* cited by examiner

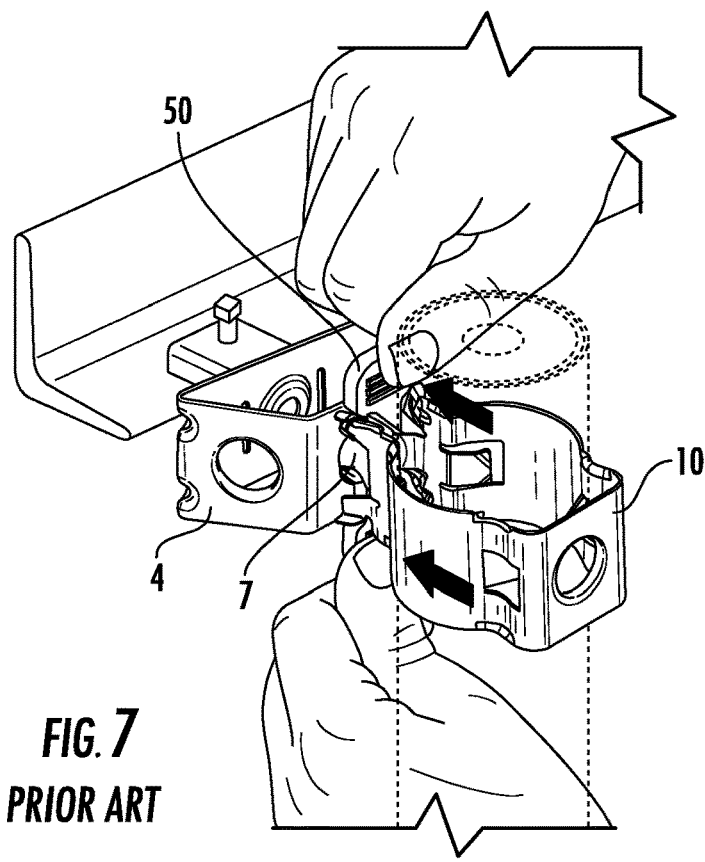
FIG. 7
PRIOR ART
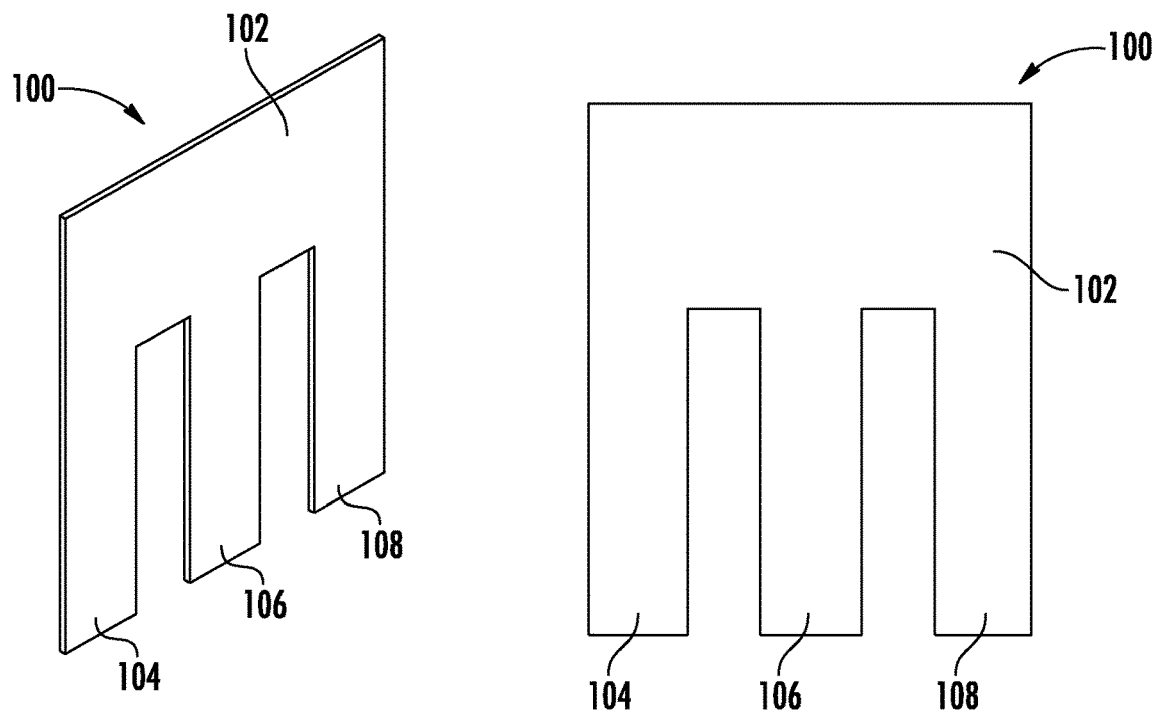
FIG. 8
FIG. 9

SUPPORT FOR HANGER FOR MOUNTING CABLES

RELATED APPLICATION

This application is a continuation of and claims priority to U.S. patent application Ser. No. 16/000,559, filed Jun. 5, 2018, which claims priority from and the benefit of U.S. Provisional Patent Application No. 62/517,366, filed Jun. 9, 2017, the disclosures of which are hereby incorporated herein in their entirety.

FIELD OF THE INVENTION

The present invention relates generally to devices for supporting cables and, in particular, to hangers and related equipment for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable hangers significantly increase the number of cables mountable to a single attachment point.

One popular stackable cable hanger is discussed in U.S. Pat. No. 8,191,836 to Korczak, the disclosure of which is hereby incorporated herein by reference in its entirety. One such cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure or adapter 4 to mount the hanger 10 thereon. The base 6 of the hanger 10 includes a reinforced hole 9 that can receive the projections of another hanger 10 to mount a second cable.

As can be best seen in FIG. 2, the arms 5 include two arcuate sections 14 that together generally define a circle within which a cable can reside. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

Hangers can be "stacked" onto each other by inserting the locking projections 7 of one hanger into the large hole 9 of the next hanger. One variety of cable hanger of this type is the SNAP-STAK® hanger, available from CommScope, Inc. (Joliet, Ill.).

The SNAP-STAK® hanger is offered in multiple sizes that correspond to the outer diameters of different cables. This arrangement has been suitable for use with RF coaxial cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

Multiple approaches to addressing this issue are offered in co-assigned and co-pending U.S. Patent Publication No. 2016/0281881 to Vaccaro, the disclosure of which is hereby incorporated herein by reference in full. One cable hanger discussed in this publication is shown in FIGS. 3 and 4 and designated broadly at 610 therein. The cable hanger 610 is somewhat similar to the cable hanger 10, inasmuch as it has a base 606, curved arms 605 and locking projections 607 that resemble those of the hanger 10 discussed above. However, the cable hanger 610 also has flex members 618 that define chords across the arcuate sections 614 of the arms 605. As can be seen in FIG. 4, cantilevered gripping members 612, 616 extend from the flex members 618 and into the cable-gripping space S within the arms 605. It can also be seen in FIG. 3 that the flex members 618 are tripartite, with two vertically offset horizontal runs 618a, 618c merging with the arcuate sections 614 of the arms 605 and a vertical run 618b extending between the horizontal runs 618a, 618c. The gripping members 612, 616 extend from opposite sides of the vertical run 618b and are vertically offset from each other.

In use, the cable hanger 610 is employed in the same manner as the cable hanger 10; a cable is inserted into the space S between the arms 605, which are then closed around the cable as the locking projections 607 are inserted into a mounting hole. The cantilevered gripping members 612, 616 can help to grip and to center the cable within the space S. The presence of the flex members 618, which are fixed end beams rather than cantilevered tabs, can provide additional gripping force beyond that of the cable hanger 10.

Either of the cable hangers 10, 610 may be subjected to loading from sources besides the weight of cables, including wind, particularly when the cable hangers are mounted on tall antenna towers or other mounting structures that are positioned well above the ground. The additional loading can make the cable hanger susceptible to slipping or even becoming dislodged. To address this possibility, a "dogbone"-shaped support (designated at 50 in FIG. 5) can be inserted between fee ends of the arms 5 of a cable hanger 10 to provide additional stability. More specifically, the support 50 has a shaft 51 with bulging ends 52. A split latch 53 projects from one side of the shaft 51. As can be seen in FIGS. 6 and 7, the support 50 is inserted between the free ends of the arms 5 near the locking projections 7 of the cable hanger 10, with the bulging ends 52 above and below the arms 5, and the split latch 53 extending into the mounting hole 8 of the adapter 4 or other mounting structure. The presence of the support 50 helps to prevent the locking projections 7 from deflecting inwardly under load, which deflection could result in unintended dislodging of the mounted cable hanger.

It may be desirable to provide additional configurations of supports for cable hangers that may be used with a cable hanger.

SUMMARY

As a first aspect, embodiments of the invention are directed to an assembly comprising: a mounting structure including a mounting hole; a cable hanger having two arms with locking projections, the locking projections inserted into the mounting hole of the mounting structure, and the arms defining a space for engaging a cable; and a support for maintaining the mounting of the cable hanger in the mounting structure, the support including a main panel and first and second fingers extending in a direction away from the main panel. The second finger is inserted between the arms of the cable hanger, and the first finger is positioned laterally of one of the arms.

As a second aspect, embodiments of the invention are directed to a method of stabilizing a mounted cable hanger, comprising:

providing a cable hanger mounted on a mounting structure, the cable hanger having two arms with locking projections, the locking projections inserted into a mounting hole of the mounting structure, and the arms defining a space for engaging a cable;

providing a support including a main panel and first and second fingers extending in a direction away from the main panel; and inserting the second finger of the support between the arms of the cable hanger such that the first finger is positioned adjacent to but lateral of one of the arms.

BRIEF DESCRIPTION OF THE FIGURES

FIG. 7 is a perspective view of a cable hanger being mounted in the adapter of FIG. 6 stabilized by the support of FIG. 5.

FIG. 8 is a perspective view of a support for a cable hanger according to embodiments of the invention.

FIG. 9 is a front view of the support of FIG. 8.

DETAILED DESCRIPTION

Figure 1:
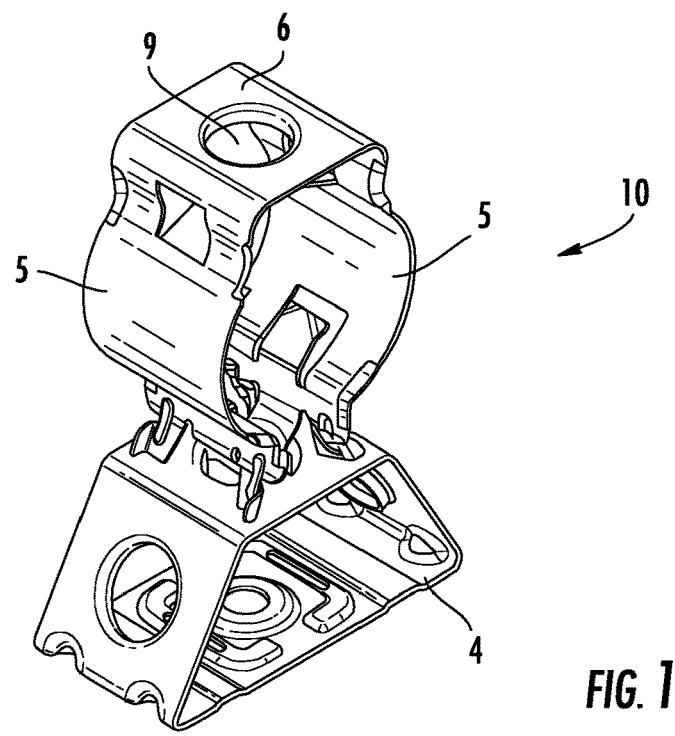
FIG. 1 is a perspective view of a prior art cable hanger.
Figure 2:
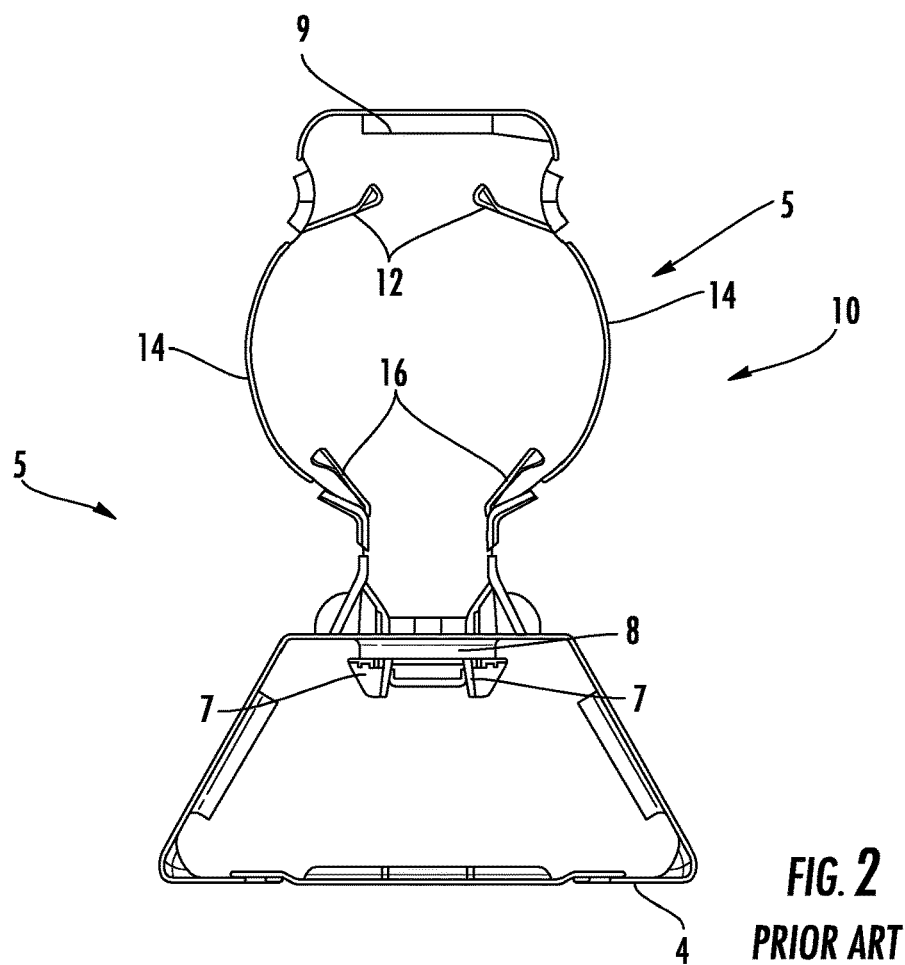
FIG. 2 is a top view of the prior art cable hanger of FIG. 1.
Figure 3:
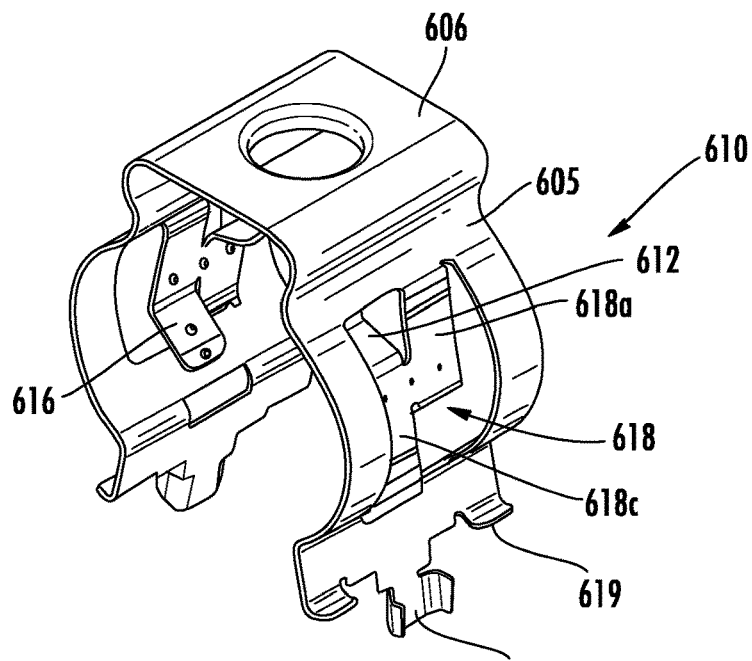
FIG. 3 is a perspective view of another prior art cable hanger.
Figure 4:
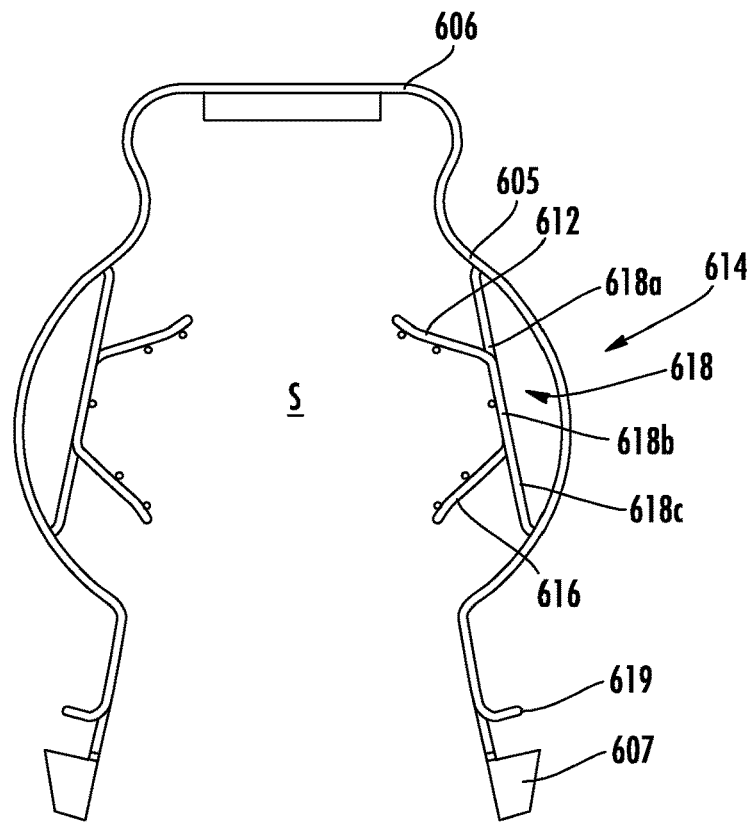
FIG. 4 is a top view of the cable hanger of FIG. 3.
Figure 5:
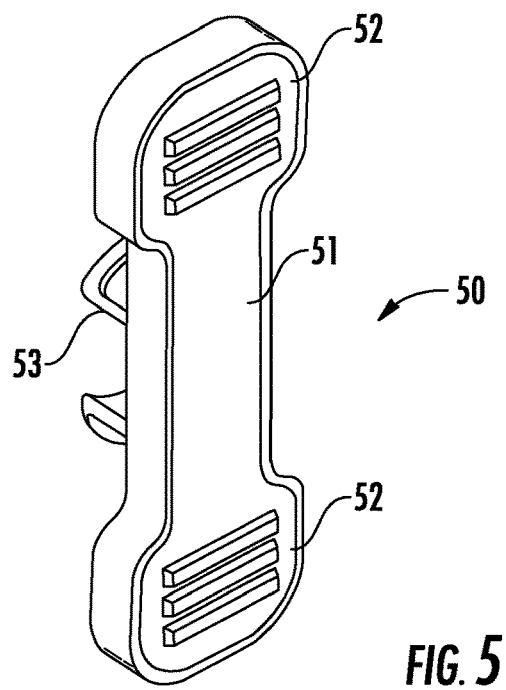
FIG. 5 is a perspective view of a prior art support for a cable hanger.
Figure 6:
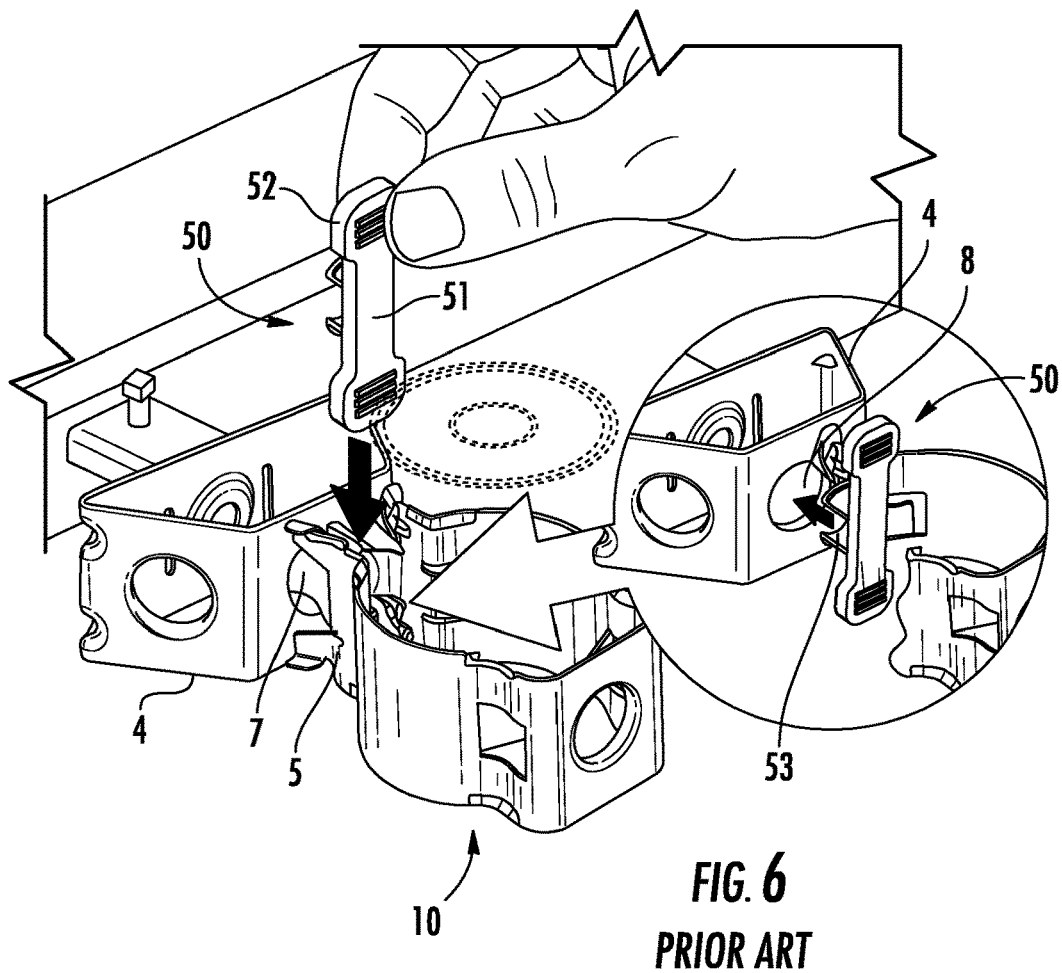
FIG. 6 is a perspective view of the support of FIG. 5 being inserted into a mounting hole of an adapter.

The present invention is described with reference to the accompanying drawings, in which certain embodiments of the invention are shown. This invention may, however, be embodied in many different forms and should not be construed as limited to the embodiments that are pictured and described herein, rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, a support for a cable hanger according to embodiments of the invention is shown in FIGS. 8 and 9 and designated broadly at 100. The support 100 includes a main panel 102 and three fingers 104, 106, 108 that extend generally parallel to each other in the same direction away from the main panel 102.

The support 100 may be formed of a number of materials, including metallic and polymeric materials. The illustrated support 100 is generally flat, although other supports may include some contour as discussed below. In some embodiments, the support 100 may be formed as a monolithic component; for example, the support 100 may be stamped from a sheet of steel or other metal. To give a sense of scale, the support 100 is typically between about 1.0 and 2.0 inches in length and width, with the fingers 104, 106, 108 being about 0.25 inches in length and 0.5 inches in width, and the gap between adjacent fingers being about 0.15 to 0.20 inches.

Figure 10:
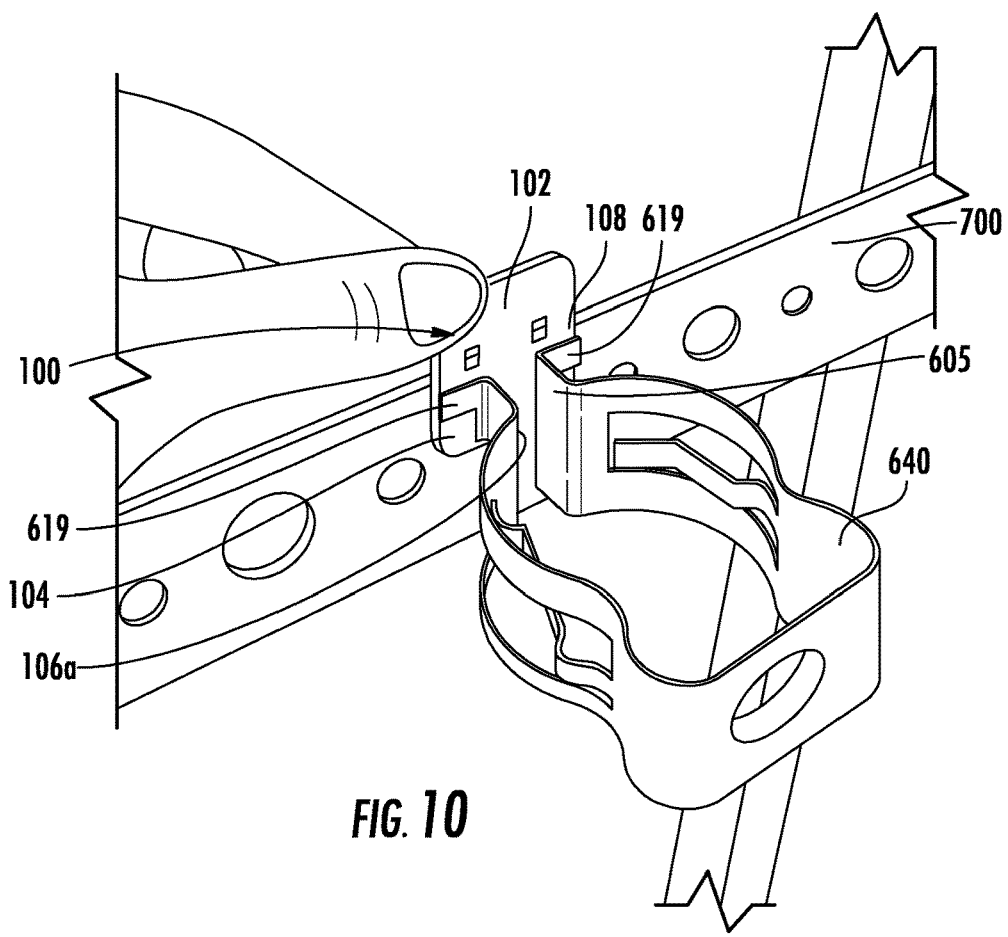
FIG. 10 is a perspective view of the support of FIG. 8 being inserted into a cable hanger mounted on a mounting structure.

Use of the support 100 can be understood with reference to FIG. 10. A cable hanger 610 is mounted in a mounting hole (typically ¾ inch in nominal diameter) of a mounting support 700 such as an antenna tower leg. The support 100 is inserted such that the center finger 106 is positioned between the free ends of the arms 605 near the locking projections (not shown) of the cable hanger 610, and the outer fingers 104, 108 are positioned laterally of their respective arms 605. The main panel 102 rests above, and in some cases on, the upper edges of the arms 605. Thus, the central finger 106 prevents the locking projections 607 from inward movement that might dislodge them from the mounting hole. In addition, the outer fingers 104, 108 fit under the hooks 619 of the arms 605 and encourage a more snug fit. Moreover, the presence of the main panel 102 on the upper edges of the arms 605 prevents the support 100 from falling through the arms 605 and therefore helps to maintain the support 100 in place.

Notably, the support 100 can be inserted into place while the cable hanger 610 is mounted in its mounting hole. This is difficult, if not impossible, with the dogbone-style support 50 discussed above. As such, a support 100 can be added where needed to an existing mounted cable hanger (or stack of cable hangers) without first removing the cable hanger from the mounting hole. This can be particularly useful for existing stacks of cable hangers, as their removal and remounting can be cumbersome.

It should also be noted that, although the support 100 is shown is use with a cable hanger 610 mounted to a mounting structure, the support 100 may also be used with a cable hanger 610 mounted to a second cable hanger 610 as part of a stack as mentioned above.

Those skilled in this art will appreciate that the support 100 may take other forms. For example, any of the main panel 102 and/or the fingers 104 may include raised protrusions or projections that may enhance the "grip" between the support 100, the mounting structure, and/or the cable hanger 610. Such raised protrusions may include embossing, nodes, nubs, flanges, dimples, detents, raised edges, teeth, and the like. Alternatively, or in addition, part or all of the support 102 may have a textured finish to enhance grip. Other types of grip-enhancing features may also be employed.

Figure 11:
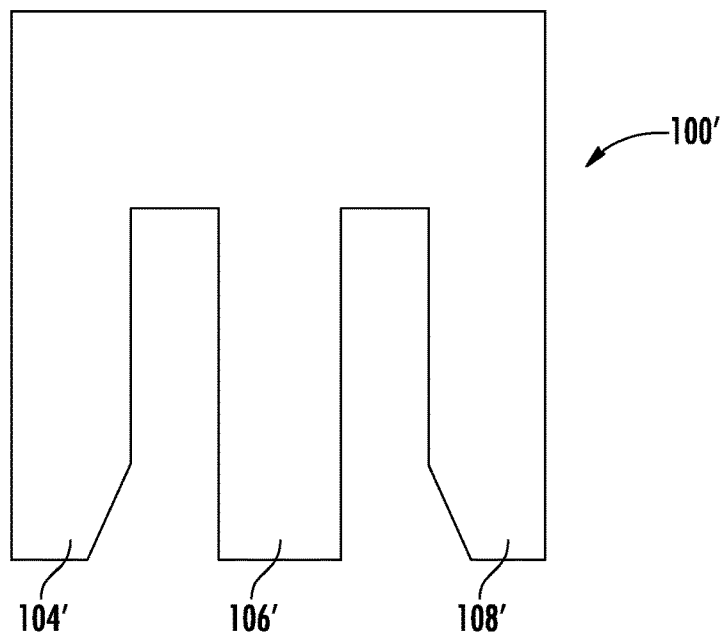
FIG. 11 is a front view of a support for a cable hanger according to alternative embodiments of the invention.
Figure 17:
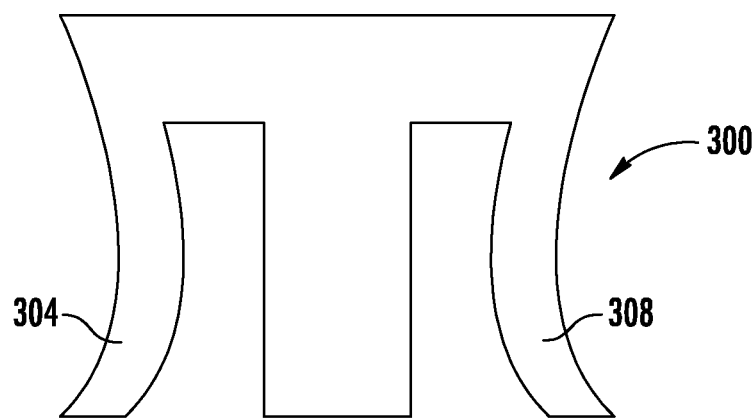
FIG. 17 is a front view of a support according to still further embodiments of the invention.

As a further alternative, as shown in FIG. 11 the outer fingers 104', 108' of a support 100' may have inner edges (i.e., the edges that face or confront the central finger 106') that are beveled, such that the support 100' can more easily be inserted into a mounted cable hanger 610. Similarly, the central finger 106' may have slightly beveled edges on its free end to facilitate insertion into a cable hanger 610. Moreover, as shown in FIG. 17, the outer fingers 304, 308 of a support 300 may be curved to facilitate insertion.

Figure 12:
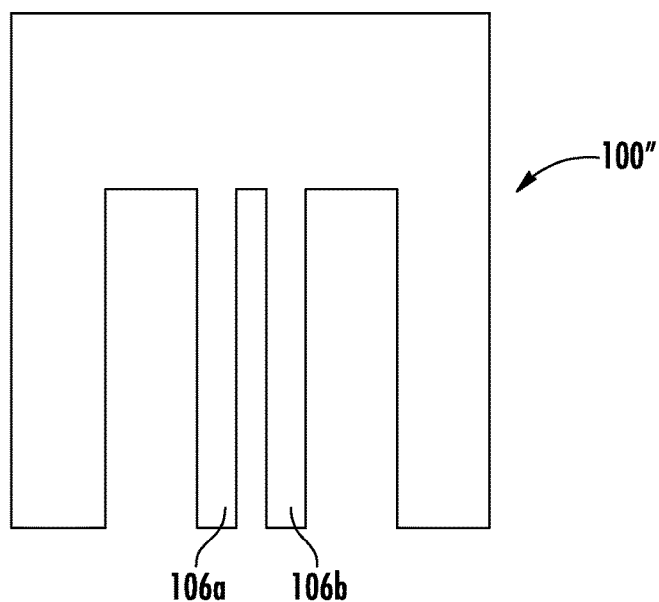
FIG. 12 is a front view of a support for a cable hanger according to additional embodiments of the invention.

Moreover, as shown in FIG. 12 in some embodiments the central finger of a support 100" may be replaced by two fingers 106a, 106b that extend in the same direction. Because such fingers are narrower than a single finger, they may deflect slightly upon insertion into a cable hanger, which may facilitate insertion while providing an outwardly-directed spring force on the locking projections of the cable hanger to maintain the cable hanger in place.

Figure 13:
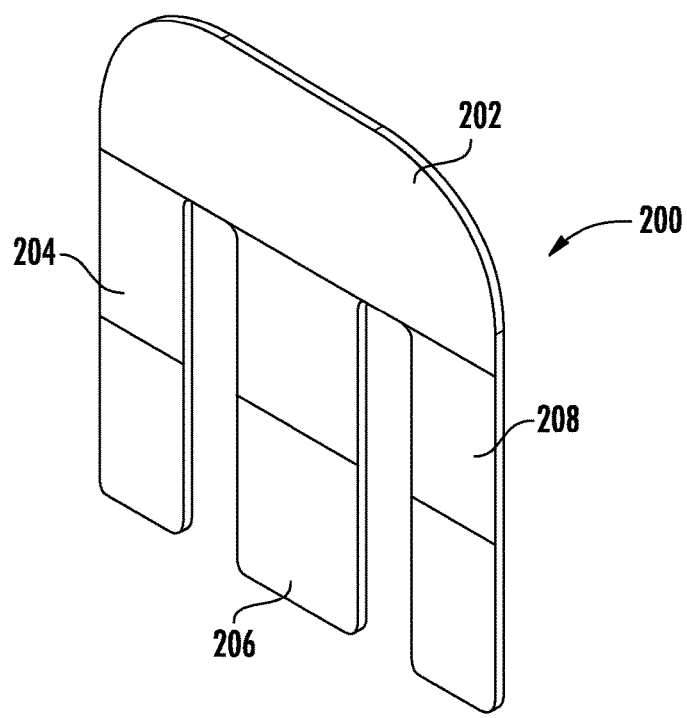
FIG. 13 is a perspective view of a support for a cable hanger according to further embodiments of the invention.
Figure 14:
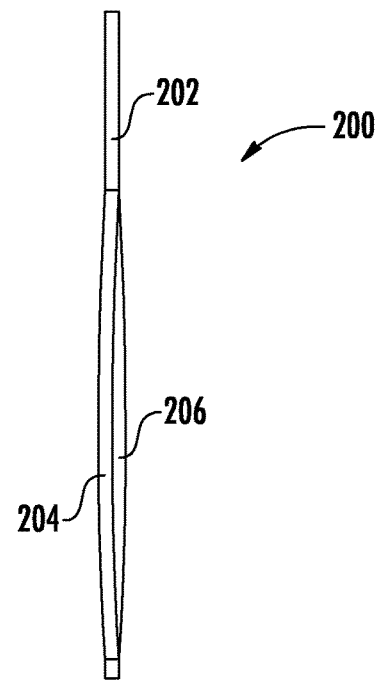
FIG. 14 is a side view of the support of FIG. 13.

Although in the illustrated embodiments the fingers 104, 106, 108 and the main panel 102 are all substantially coplanar, in some embodiments some of these components may not be coplanar. For example, the main panel 102 may be perpendicular to the fingers 104, 106, 108, or may be disposed at an oblique angle to the fingers 104, 106, 108. In other embodiments the outer fingers 104, 108 may be coplanar with each other, but not with the central finger 106. In addition, and as shown in FIGS. 13 and 14, a support 200 may have one or more of the fingers 204, 206, 208 that are bent or skewed out of the plane defined by the main panel 202 to act as a spring. For example, the outer fingers 204, 208 may be bent into a shallow "V"-shape, such that they have the same profile as each other, but are not coplanar with the central finger 206. The central finger 206 has a shallow V-shape also, but the vertex of the "V" of the central finger 206 extends in the opposite direction to those of the outer fingers 204, 208. In such a configuration, the outer fingers 204, 208 can apply additional pressure to the hooks 619 of the arms 605 of the cable hanger 610 and thereby provide a more secure fit; the same is true for the central finger 206, as it can apply pressure to the underlying mounting structure.

Figure 15:
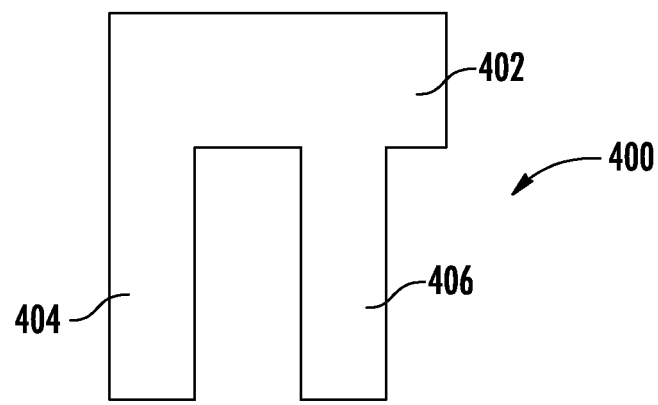
FIG. 15 is a front view of a support according to additional embodiments of the invention.

In addition, in some embodiments all or part of one of the outer fingers may be omitted. As an example, a support 400 is shown in FIG. 15 and has a main panel 402 and a "central" finger 406, but has only one outer finger 404. In this instance, the central finger 406 is inserted between the arms of a cable hanger, and the outer finger 404 resides laterally of one of the arms. As shown, the main panel 402 may "overhang" on the side opposite the outer finger 404 to rest on the upper edge of the opposite arm of the cable hanger.

Figure 16:
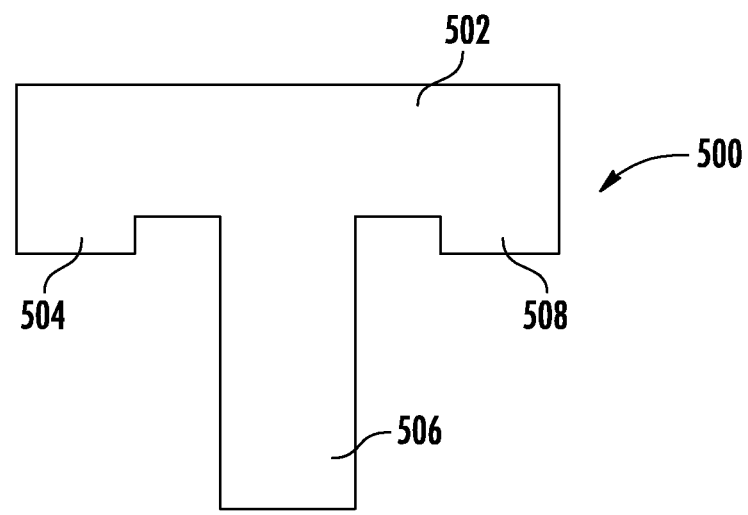
FIG. 16 is a front view of a support according to further embodiments of the invention.

Finally, in some embodiments the central and outer fingers may be of different lengths. As an extreme example, FIG. 16 shows a support 500 with a main panel 502, a longer central finger 506, and very short outer fingers 504, 508. The outer fingers 504, 508 may or may not be sufficient in length to fit beneath the hooks on the arms of a cable hanger as discussed above.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. An assembly comprising:
   a mounting structure including a mounting hole;
   a cable hanger having two arms with locking projections, the locking projections inserted into the mounting hole of the mounting structure, and the arms defining a space for engaging a cable; and
   a support for maintaining the mounting of the cable hanger in the mounting structure, the support including a main panel and first and second fingers extending in a direction away from the main panel;
   wherein the second finger is inserted between the arms of the cable hanger, and the first finger is positioned laterally of one of the arms; and
   wherein the second finger is bent to a shallow V-shaped profile.

2. The assembly defined in claim 1, wherein the support further comprises a third finger extending away from the main panel in the same direction as the first and second fingers.

3. The assembly defined in claim 2, wherein the first and third fingers are substantially coplanar.

4. The assembly defined in claim 2, wherein the first and third fingers have substantially identical profiles as they extend away from the main panel.

5. The assembly defined in claim 2, further comprising a fourth finger that extends from the main panel, the fourth finger being inserted between the locking projections of the cable hanger.

6. The assembly defined in claim 1, wherein the main panel and the second finger are substantially coplanar.

7. The assembly defined in claim 1, wherein the first finger is bent to a shallow V-shaped profile.

8. The assembly defined in claim 1, wherein the first finger has a beveled inner edge.

9. A method of stabilizing a mounted cable hanger, comprising:
   providing a cable hanger mounted on a mounting structure, the cable hanger having two arms with locking projections, the locking projections inserted into a mounting hole of the mounting structure, and the arms defining a space for engaging a cable;
   providing a support including a main panel and first and second fingers extending in a direction away from the main panel; and
   inserting the second finger of the support between the arms of the cable hanger such that the first finger is positioned adjacent to but lateral of one of the arms;
   wherein the second finger is bent to a shallow V-shaped profile.

10. The method defined in claim 9, wherein a cable is mounted in the space defined by the arms of the cable hanger.

11. The method defined in claim 9, wherein the mounting structure is a leg of an antenna tower.

12. The method defined in claim 9, wherein the support further comprises a third finger extending away from the main panel in the same direction as the first and second fingers.

13. The method defined in claim 9, wherein the first and third fingers are substantially coplanar.

14. The method defined in claim 9, wherein the first and third fingers have substantially identical profiles as they extend away from the main panel.

15. The method defined in claim 9, further comprising a fourth finger that extends from the main panel, the fourth finger being inserted between the locking projections of the cable hanger.

* * * * *